United States Patent
Dwyer et al.

(10) Patent No.: US 6,687,508 B1
(45) Date of Patent: Feb. 3, 2004

(54) SYSTEM AND METHOD FOR PROVIDING NUMERIC-ONLY PAGING SERVICE WITH WIRELESS TELEPHONE SERVICE

(76) Inventors: Christopher Brian Dwyer, 8641 Glenlyon, Fort Myers, FL (US) 33912; Carl Dean Wilber, 1002 Wildwood St., Sulton, WA (US) 98294

( * ) Notice: Subject to any disclaimer, the term of this patent is extended or adjusted under 35 U.S.C. 154(b) by 11 days.

(21) Appl. No.: 09/658,001

(22) Filed: Sep. 8, 2000

(51) Int. Cl.$^7$ ................................................. H04Q 7/20
(52) U.S. Cl. ........................ 455/466; 455/458; 455/414
(58) Field of Search ................................ 455/426, 414, 455/422, 413, 412, 466, 551, 560, 458, 416; 340/7.1, 7.2–7.29, 7.31, 7.43–7.49, 7.51–7.53

(56) References Cited

U.S. PATENT DOCUMENTS

| | | | |
|---|---|---|---|
| H610 H | | 3/1989 | Focarile et al. |
| 5,138,311 A | * | 8/1992 | Weinberg .............. 340/825.03 |
| 5,148,473 A | | 9/1992 | Freeland et al. |
| 5,247,700 A | | 9/1993 | Wohl et al. |
| 5,311,516 A | * | 5/1994 | Kuznicki et al. .......... 370/94.1 |
| 5,541,976 A | | 7/1996 | Ghisler |
| 5,701,337 A | | 12/1997 | Silver et al. |
| 5,706,211 A | | 1/1998 | Beletic et al. |
| 5,737,688 A | * | 4/1998 | Sakai et al. .................. 455/426 |
| 5,737,707 A | | 4/1998 | Gaulke et al. |
| 5,742,668 A | * | 4/1998 | Pepe et al. ..................... 379/58 |
| 5,745,689 A | | 4/1998 | Yeager et al. |
| 5,802,470 A | | 9/1998 | Gaulke et al. |
| 5,819,284 A | | 10/1998 | Farber et al. |
| 5,838,252 A | | 11/1998 | Kikinis |
| 5,854,984 A | | 12/1998 | Buhrmann et al. |
| 5,884,188 A | | 3/1999 | Hayes, Jr. |
| 5,898,758 A | | 4/1999 | Rosenberg |
| 5,940,756 A | * | 8/1999 | Sibecas et al. .............. 455/426 |
| 5,978,837 A | | 11/1999 | Foladare et al. |
| 5,995,597 A | | 11/1999 | Woltz et al. |
| 6,002,945 A | | 12/1999 | McDuffee |
| 6,023,700 A | | 2/2000 | Owens et al. |
| 6,052,563 A | | 4/2000 | Macko |
| 6,219,694 B1 | | 4/2001 | Lazaridis et al. |
| 6,334,054 B1 | * | 12/2001 | Link, II et al. .............. 455/413 |

FOREIGN PATENT DOCUMENTS

| | | |
|---|---|---|
| EP | 0 772 327 A2 | 5/1997 |
| JP | 409305155 A | 11/1997 |
| JP | 11289346 | 10/1999 |
| WO | WO 97/33421 | 9/1997 |

* cited by examiner

Primary Examiner—Edward F. Urban
Assistant Examiner—Charles Craver
(74) Attorney, Agent, or Firm—Cook, Alex, McFarron, Manzo, Cummings & Mehler, Ltd.

(57) ABSTRACT

A system for providing numeric-only paging service to wireless telephone service are shown to include a voice mail system configured to receive dual-tone, multi-frequency signals and convert those signals into a short message service text message. The voice mail system is linked with a short message service server to transmit the short message service text message to the server. In response to receipt of the text message, the server transmits a page to a mobile telephone switching office for ultimate transmission of the text message to a wireless telephone owned by a wireless telephone subscriber. An auxiliary telephone number, distinct from the wireless telephone main telephone number, is assigned for the numeric-only paging service to maintain the privacy of the main telephone number, which translates into reduced airtime.

26 Claims, 1 Drawing Sheet

SYSTEM AND METHOD FOR PROVIDING NUMERIC-ONLY PAGING SERVICE WITH WIRELESS TELEPHONE SERVICE

FIELD OF THE INVENTION

The present invention is directed generally to services for wireless technology, and more particularly, to traditional numeric-only paging service for wireless digital telephone technology.

BACKGROUND OF THE INVENTION

With the advent of wireless digital telephones, new features have become available for wireless cellular telephone users. One of the features developed is short message service (SMS); which is commonly available from carriers that provide digital wireless service. With this technology, digital wireless carriers can provide an additional means of communication for their subscribers, typically at no additional charge. In particular, digital wireless carriers permit their subscribers to send and receive short text messages (up to one hundred sixty alphanumeric characters) to and from a variety of sources, including paging terminals and even the Internet. Digital wireless telephones have the ability to send and receive such messages. It will be appreciated, however, that such messages are not derived from the dual-tone, multi-frequency (DTMF) signals generated by pressing respective ones of the keys on a conventional telephone keypad. Rather, short text message signals are alphanumeric in nature and are generated by keyboards of computer terminals and similar devices. When sending an SMS message via a telephone, the telephone keypad is used as a keyboard to generate the desired alphanumeric message.

In light of the foregoing, it will be understood that alphanumeric and SMS paging technologies have been implemented for use with digital wireless telephone technology. Traditional alphanumeric pagers have been replaced by digital telephones, which have the capability to function both as a telephone and as a paging receiver able to send and receive alphanumeric and/or SMS pages. As a result, only one device—the digital telephone—is needed. Prior to the integration of this technology, a cellular telephone was needed for telephone communication and a pager was needed for alphanumeric text messaging.

One drawback of the digital wireless/SMS integrated technology is that it has not met the need to implement traditional, numeric-only paging service with wireless telephone service. As will be appreciated by those skilled in the art, traditional, numeric-only paging service uses the DTMF signals generated by pressing respective ones of the keys on a conventional telephone keypad to derive a numeric-only page, which identifies a callback telephone number when received by a paging receiver. Because this technology has not been developed, digital wireless subscribers could not be paged by telephones.

Another drawback of wireless telephone technology is that there has never been a paging technology implemented therewith permitting the wireless telephone subscriber to maintain the privacy of his/her wireless telephone number. As will be appreciated, the need to maintain the privacy of a wireless telephone subscriber's wireless telephone number to minimize costs for use of the telephone is of prime concern. Use of wireless telephones is expensive, and it is believed that costs associated therewith will continue to grow as demand for such use increases over the next few decades. By failing to maintain the privacy of a wireless telephone subscriber's wireless telephone number, the subscriber can be subjected to unnecessary use, which translates into unnecessary, undesirable costs.

In light of the foregoing, it is desirable to implement traditional, numeric-only paging technology with wireless telephone technology.

It is further desirable to implement traditional, numeric-only paging technology with digital wireless telephone technology.

It is still further desirable to develop an implementation of traditional, numeric-only paging technology for use with wireless telephone technology that maintains the privacy of a wireless telephone subscriber's wireless telephone number.

These and other objects are met by various aspects and forms of the present invention. These and other objects will become apparent from the following description. It will be understood, however, that an apparatus or system could still appropriate the claimed invention without accomplishing each and every one of these objects, including those gleaned from the following description. The appended claims, not the objects, define the subject matter of the invention. Any and all objects are derived from the preferred forms of the invention, not the invention in general.

SUMMARY OF THE INVENTION

The present invention is directed to a system for providing numeric-only paging service to wireless telephone service. The system includes a dual-tone, multi-frequency-to-short message service converter unit configured to receive dual-tone, multi-frequency signals and convert the signals into a short message service text message. The system also includes a short message service server coupled in communication with the converter unit. The short message service server is adapted to receive the short message service text message and transmit a page to a mobile telephone switching office for ultimate transmission of the short message service text message to a wireless telephone. In a preferred embodiment, the DTMF-to-SMS converter unit is a voice mail system.

The present invention is also directed to a method of providing numeric-only paging service for wireless telephone service. The method includes the step of receiving a plurality of dual-tone, multi-frequency signals from a telephone. It also includes the step of converting the plurality of dual-tone, multi-frequency signals into a short message service text message. The method further includes the step of transmitting the short message service text message to a short message service server. It still further includes the step of transmitting a page to a mobile telephone switching office to initiate ultimate transmission of the short message service text message to a wireless telephone, in response to receipt of the short message service text message by the short message service server.

The method of the present invention is also directed to the step of assigning an auxiliary telephone number to a wireless telephone. The auxiliary telephone number is distinct from a main telephone number assigned to said wireless telephone which activates calls for the wireless telephone. The method further includes the step of receiving a telephone call from a telephone in response to dialing of the auxiliary telephone number. It still further includes the step of receiving a plurality of dual-tone, multi-frequency signals from the telephone. Still yet further, the method includes the step of converting the plurality of dual-tone, multi-frequency signals into a short message service text message. Moreover, it includes the step of transmitting the short message service text message to a short message service server. Additionally, it includes the step of transmitting a page to a mobile telephone switching office to initiate ultimate transmission of the short message service text message to the wireless telephone in response to receipt of the short message service text message by the short message service server.

BRIEF DESCRIPTION OF THE DRAWING

In describing the preferred form of the present invention, reference is made to the accompanying drawing, wherein:

The sole FIGURE is a diagrammatic view of a numeric-only paging system for use in conjunction with wireless telephone service.

DETAILED DESCRIPTION OF THE PREFERRED EMBODIMENT

Figure 1:
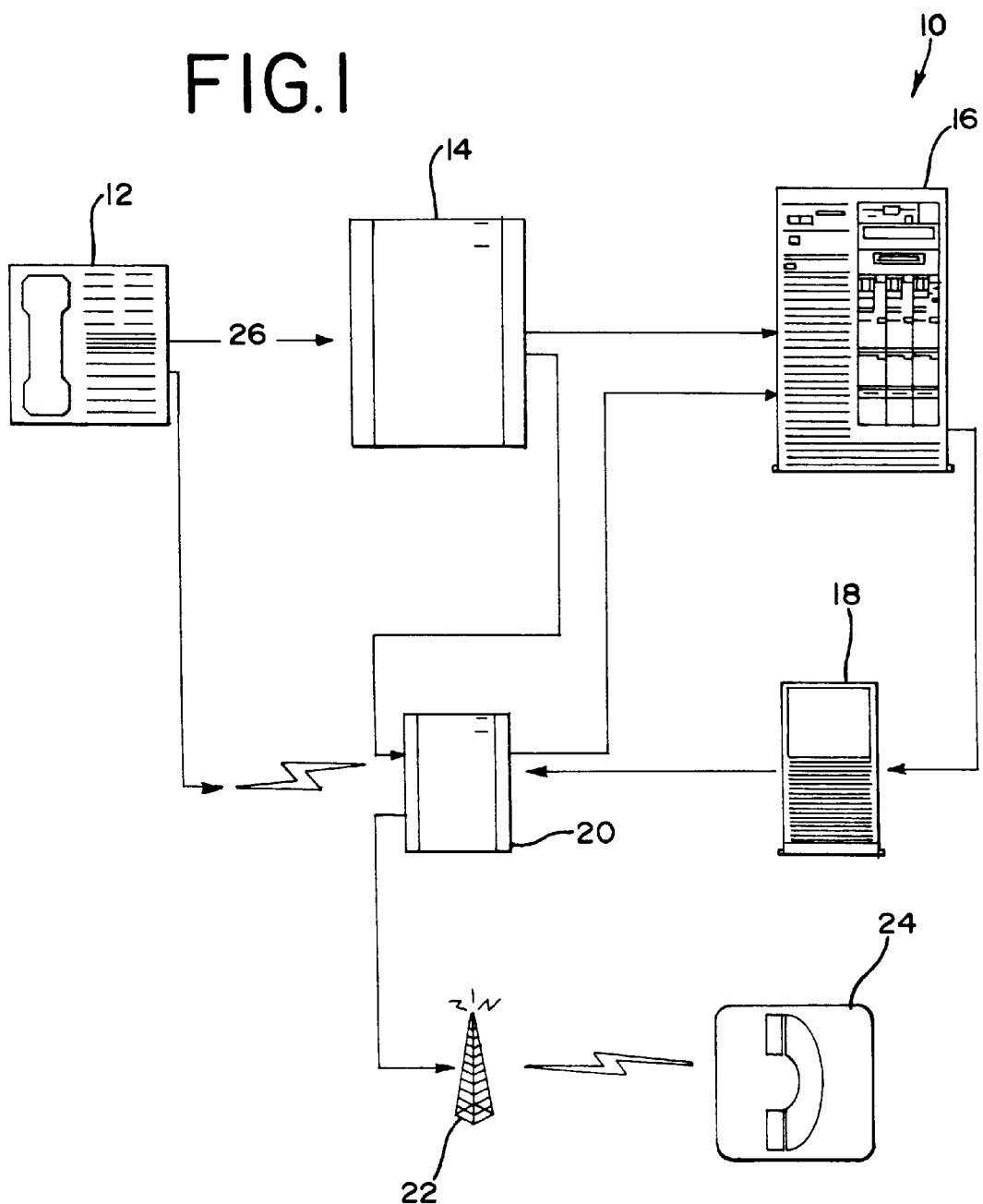

The drawing illustrates a communications system generally designated 10 for providing traditional, numeric-only paging service to subscribers of digital wireless telephone service. Communications system 10 includes a telephone 12 shown illustratively as a landline telephone. It will be appreciated, however, that telephone 12 could alternatively be a wireless telephone. Communications system 10 further includes a landline telephone company switch 14, which is conventionally located at a central office of a telephone service provider.

Communications system 10 also includes a voice mail system 16 and a short message service (SMS) server 18 for providing the numeric-only paging service. A mobile telephone switching office (MTSO) 20, a cell site 22 and a digital wireless telephone 24 are also included for providing digital wireless telephone service. As will be appreciated, the drawing illustrates relatively minimal hardware components for system 10. In practice, a plurality of each of these hardware components will ordinarily be used.

In accordance with the present invention, each digital wireless telephone subscriber receiving the numeric-only paging service will be assigned at least two telephone numbers. The main telephone number assigned to the subscriber will correspond to normal call delivery. When the main number is dialed, the subscriber's wireless telephone will ring and permit normal call delivery. The subscriber's wireless service provider will assign this main telephone number. The auxiliary telephone number assigned to the subscriber will correspond with the numeric-only paging service. This auxiliary telephone number will be assigned by the wireless service provider, or, alternatively, could be assigned by another numeric-only paging service provider. Use of this auxiliary telephone number allows the wireless telephone subscriber to maintain the privacy of his/her main wireless telephone number so that use of wireless telephone airtime is most efficient.

Reference will now be made to the drawing to describe the functionality of the numeric-only paging service. First, a telephone user initiates a telephone call at telephone 12. As will be appreciated, this telephone call is initiated when the telephone user at telephone 12 desires to have a digital wireless telephone subscriber using digital wireless telephone 24 to place a return call. The call at telephone 12 is initiated by lifting its associated handset and pressing appropriate keys on its associated keypad corresponding with the auxiliary telephone number assigned to the digital wireless telephone subscriber. In the case where telephone 12 represents a landline telephone, the call is then routed through a plain ordinary telephone service (POTS) line 26 to landline telephone company switch 14, from which it is forwarded to voice mail system 16 directly or through MTSO 20, as shown. In the case where telephone 12 represents a wireless telephone, the call is routed to MTSO 20 and then forwarded to voice mail system 16.

Voice mail system 16 is preferably specially configured to provide numeric-only paging service. Voice mail system 16 preferably emulates a paging terminal call and prompts the telephone user at telephone 12 to enter a "callback" telephone number. Preferably, voice mail system 16 offers no options for leaving voice message. Further details regarding a preferred class of service for voice mail system 16 are set forth below.

In response to the prompt, the telephone user at telephone 12 will press telephone keys indicative of the "callback" number. As a result, a DTMF signal will be generated for each pressed key. Voice mail system 16 receives each DTMF signal, converts it to text corresponding with the number associated therewith and delivers the text message to SMS server 18 for transmission to the digital wireless telephone. Voice mail system 16 also translates the auxiliary number into the main telephone number to permit proper transmission of the numeric page.

As will be appreciated by those skilled in the art, voice mail platforms, such as voice mail system 16 illustrated in the drawing, are typically configured to connect to SMS servers, such as SMS server 18 illustrated in the drawing. The connections vary, but are ordinarily either direct links or dial-up connections. As will be appreciated, a direct link connection is preferred, and such connection is preferably used for communications system 10.

It will also be appreciated that a variety of paging protocols can be provided by voice mail system 16, including TAP, SMPP, SNPP, TNPP and DTMF. In its preferred form, the SMS server 18 of communications system 10 can support all of these protocols. Once the voice mail system 16 processes the message, it delivers an emulated text message to SMS server 18, which will function normally provided any of the supported protocols are being used.

The SMS server 18 then transmits a paging signal to MTSO 20 for message delivery. The SMS server 18 is preferably connected to MTSO 20 through either a dial-up connection or a serial link. Once paged, MTSO 20 locates the digital subscriber based upon the nearest cell site 22 to digital wireless telephone 24, and thereafter delivers the numeric-only page indicative of the "callback" number.

This numeric-only paging service for wireless telephony eliminates the need for obtaining, maintaining and insuring two wireless hardware devices by the wireless subscriber. It provides traditional numeric-only paging service directly to the subscriber's wireless telephone, and it permits the subscriber to maintain the privacy of the main telephone number associated with the wireless telephone. In particular, it requires that only the auxiliary pager number be dialed in order to transmit a numeric-only page to the digital wireless subscriber.

The preferred voice mail platform for the present invention is now described. As background, those skilled in the art will appreciate that voice mail platform mailbox types are generally defined by their class of service. The class of service for a particular mailbox type normally defines fields such as message length, greeting length, and number of messages. Additionally, a mailbox can be configured to deliver an SMS message to a subscriber's wireless telephone, or dial out to a pager for notification of a new voice message. In most cases, the platform vendor creates various classes of service at the time of installation, or as needed. Ordinarily, a new class of service can be created, as desired. Several different platforms are available for use. With the present invention, it is contemplated that the vendor will preferably be contacted to assist with the creation of a preferred new class of service. This new class of service will preferably have the following characteristics.

A first characteristic of this new class of service is that it will preferably provide for a standard generic attendant greeting that offers the caller only one option, namely entry of the "callback" number. The greeting might state, for instance, "please enter a telephone number where you can be reached", and the caller will then be given a predetermined period of time in which to enter the "callback" number. This greeting is preferably permanent, and cannot be personalized, changed, or altered by the service subscriber. Preferably, upon completion of entry of the "callback" number by the caller, an acknowledgment is generated, which can acknowledge that the "callback" number was properly entered, the dual-tone, multi-frequency signals were properly converted into a short message service text message, the numeric-only page was successfully transmitted, or all of the foregoing. This acknowledgment could take one of many forms, but is preferably a simple confirmation tone, which might or might not be preceded by an acknowledgment from the auto-attendant. Those skilled in the art will appreciate that the acknowledgment will vary depending upon the capabilities and resources of the voice mail platform and the flexibility of the vendor when creating the preferred class of service.

A second characteristic of this new class of service is that it preferably does not permit voice message capability. In particular, unlike standard voice mailboxes, the mailbox for this class of service preferably will not offer the caller the option to leave a voice message. The mailbox simply will register and interpret the DTMF tones generated for the "callback" number and deliver the appropriate acknowledgment to the caller.

A third characteristic of this new class of service is that it preferably has no message limits. In particular, the maximum limits should be set on all parameters for voice storage and message limits. No voice message storage is contemplated, so relatively little memory will be required. In effect, the voice mailbox serves as a pass-through account only.

A fourth characteristic of this new class of service is that it preferably has the SMS port enabled. As illustrated in the drawing, once the DTMF tones are received and interpreted, the short message text is derived and delivered to the SMS server. The SMS port must be enabled to permit delivery of this numeric page to the SMS server.

A fifth characteristic of this new class of service is that its mailbox is preferably separate from a mailbox created for standard voice mail service. Preferably, if a subscriber also has standard voice mail, which will often be the case, the subscriber will preferably have two separate accounts established. As will be appreciated, the main telephone number could be associated with the standard voice mail service, whereas the auxiliary telephone number could be associated with the numeric-only paging service of the present invention. As will be appreciated, the present invention is exclusive of standard voice mail service. The present invention can be offered as a stand-alone service, it can be processed through a voice mail system entirely separate from a system providing standard voice mail service, it can be implemented (preferably separately) with a voice mail system that also provides standard voice mail service.

As will be appreciated by those skilled in the art, voice mail system 16 illustrated in the drawing and described above could be replaced by a paging terminal interface of the type readily available for use. It is contemplated that such a paging terminal interface would perform some of the same functions as voice mail system 16, namely translation of the DTMF tones, conversion of those tones to text and transmission of the text message to SMS server 18. It will be appreciated, however, that use of a paging terminal interface in lieu of voice mail system 16 would be generally much more expensive. In particular, use of a voice mail system makes more practical sense, considering most wireless telephone users already subscribe to standard voice mail service and their voice mail system would therefore need merely be re-configured, preferably as described above. Additionally, since the voice mail system is typically already in place, it is already generating revenue for the wireless telephone service provider. For purposes of this specification, including the following claims, both a paging terminal interface unit and a voice mail system, such as voice mail system 16, shall fall within the scope of the phrases "dual-tone, multi-frequency-to-short message service converter" and "DTMF-to-SMS converter". It will be appreciated, however, that the phrases "dual-tone, multi-frequency-to-short message service converter" and "DTMF-to-SMS converter" shall also encompass an device that performs such conversion.

While this invention has been described with reference to preferred aspects of the present invention, it will be understood that this description shall not be construed in a limiting sense. Rather, various changes and modifications can be made to the preferred aspects of this invention without departing from the true spirit and scope of the invention, as defined by the following claims. Furthermore, it will be appreciated that any such changes and modifications would be recognized by those skilled in the art as an equivalent to one element or more of the following claims, and shall be covered by such claims to the fullest extent permitted by law.

What is claimed is:

1. A method of providing numeric-only paging service for wireless telephone service, comprising the steps of:

receiving a telephone call from a telephone in response to dialing of an auxiliary telephone number at said telephone, said auxiliary telephone number being distinct from a main telephone number assigned to a wireless telephone;

thereafter, receiving a plurality of dual-tone, multi-frequency signals from said telephone;

converting said plurality of dual-tone, multi-frequency signals into a short message service text message;

transmitting said short message service text message to a short message service server;

in response to receipt of said short message service text message by said short message service server, transmitting a page to a mobile telephone switching office to initiate ultimate transmission of said short message service text message to a wireless telephone; and wherein the method further comprises the step of translating said auxiliary telephone number into said main telephone number.

2. The method as defined by claim 1 further comprising the step of transmitting a prompt to said telephone in response to receipt of said telephone call prompting input of said dual-tone, multi-frequency signals.

3. The method as defined by claim 2 wherein said prompt comprises a voice greeting.

4. The method as defined by claim 3 wherein said voice greeting offers only an option of generating dual-tone, multi-frequency signals in response thereto.

5. The method as defined by claim 1 further comprising the step of transmitting an acknowledgment to said telephone in response to receipt of said plurality of dual-tone, multi-frequency signals.

6. The method as defined by claim 5 wherein said acknowledgment comprises a confirmation tone signal.

7. The method as defined by claim 6 wherein said acknowledgment further comprises a voice signal.

8. The method as defined by claim 1 further comprising the step of transmitting an acknowledgment to said telephone in response to conversion of said dual-tone, multi-frequency signals into said short text message service text message.

9. The method as defined by claim 8 wherein said acknowledgment comprises a confirmation tone signal.

10. The method as defined by claim 9 wherein said acknowledgment further comprises a voice signal.

11. The method as defined by claim 1 further comprising the step of transmitting an acknowledgment to said telephone in response to successful transmission of said short text message service text message.

12. The method as defined by claim 11 wherein said acknowledgment comprises a confirmation tone signal.

13. The method as defined by claim 12 wherein said acknowledgment further comprises a voice signal.

14. A method of providing numeric-only paging service for wireless telephone service, comprising the steps of:

assigning an auxiliary telephone number to a wireless telephone, said auxiliary telephone number being distinct from a main telephone number assigned to said wireless telephone which activates call for said wireless telephone;

receiving a telephone call from a telephone in response to dialing of said auxiliary telephone number;

thereafter, receiving a plurality of dual-tone, multi-frequency signals from said telephone;

converting said plurality of dual-tone, multi-frequency signals into a short message service text message;

transmitting said short message service text message to a short message service server;

in response to receipt of said short message service text message by said short message service server, transmitting a page to a mobile telephone switching office to initiate ultimate transmission of said short message service text message to said wireless telephone; and wherein said method further comprises the step of translating said auxiliary telephone number into said main telephone number.

15. The method as defined by claim 14 further comprising the step of transmitting a prompt to said telephone in response to receipt of said telephone call prompting input of said dual-tone, multi-frequency signals.

16. The method as defined by claim 15 wherein said prompt comprises a voice greeting.

17. The method as defined by claim 16 wherein said voice greeting offers only an option of generating dual-tone, multi-frequency signals in response thereto.

18. The method as defined by claim 14 further comprising the step of transmitting an acknowledgment to said telephone in response to receipt of said plurality of dual-tone, multi-frequency signals.

19. The method as defined by claim 18 wherein said acknowledgment comprises a confirmation tone signal.

20. The method as defined by claim 19 wherein said acknowledgment further comprises a voice signal.

21. The method as defined by claim 14 further comprising the step of transmitting an acknowledgment to said telephone in response to conversion of said dual-tone, multi-frequency signals into said short text message service text message.

22. The method as defined by claim 21 wherein said acknowledgment comprises a confirmation tone signal.

23. The method as defined by claim 22 wherein said acknowledgment further comprises a voice signal.

24. The method as defined by claim 14 further comprising the step of transmitting an acknowledgment to said telephone in response to successful transmission of said short text message service text message.

25. The method as defined by claim 24 wherein said acknowledgment comprises a confirmation tone signal.

26. The method as defined by claim 25 wherein said acknowledgment further comprises a voice signal.

* * * * *